United States Patent
Hoekstra et al.

(10) Patent No.: US 6,304,277 B1
(45) Date of Patent: Oct. 16, 2001

(54) REMOTE MODIFICATION OF DIGITAL IMAGES USING SCRIPTS

(75) Inventors: Jeffrey D. Hoekstra, Arden Hills; Donald Atkinson, Mound, both of MN (US)

(73) Assignee: Colorcentric.com, Inc., Minneapolis, MN (US)

(*) Notice: Subject to any disclaimer, the term of this patent is extended or adjusted under 35 U.S.C. 154(b) by 0 days.

(21) Appl. No.: 09/231,735

(22) Filed: Jan. 15, 1999

(51) Int. Cl.$^7$ .................................................. G06T 11/60
(52) U.S. Cl. ........................ 345/600; 382/302; 358/357
(58) Field of Search .................................. 345/429, 431; 358/357; 707/526; 382/302

(56) References Cited

U.S. PATENT DOCUMENTS

| | | | |
|---|---|---|---|
| 4,500,919 | 2/1985 | Schreiber | 358/518 |
| 4,524,421 | 6/1985 | Searby et al. | 345/431 |
| 4,829,370 | 5/1989 | Mayne et al. | 358/537 |
| 5,142,616 | 8/1992 | Kellas et al. | 345/435 |
| 5,157,506 | 10/1992 | Hannah | 358/298 |
| 5,163,122 * | 11/1992 | Urabe et al. | 345/433 |
| 5,208,911 | 5/1993 | Newman et al. | 345/152 |
| 5,212,546 | 5/1993 | Arazi et al. | 358/518 |
| 5,243,414 | 9/1993 | Dalrymple et al. | 358/500 |
| 5,249,263 | 9/1993 | Yanker | 345/431 |
| 5,254,978 | 10/1993 | Beretta | 345/150 |
| 5,257,097 | 10/1993 | Pineau et al. | 358/500 |
| 5,271,096 | 12/1993 | Cook | 345/431 |
| 5,283,667 | 2/1994 | Kojima et al. | |
| 5,293,258 | 3/1994 | Dattilo | 358/518 |
| 5,296,947 | 3/1994 | Bowers | 358/527 |
| 5,313,291 | 5/1994 | Appel et al. | 358/501 |
| 5,315,416 | 5/1994 | Taniuchi et al. | 358/537 |
| 5,323,249 | 6/1994 | Liang | 358/518 |
| 5,339,176 | 8/1994 | Smilansky et al. | 358/504 |
| 5,384,862 | 1/1995 | Echerer et al. | |
| 5,412,616 * | 5/1995 | Kellas et al. | 345/435 |
| 5,461,493 | 10/1995 | Venable | 358/520 |
| 5,568,571 | 10/1996 | Willis et al. | |
| 5,583,665 * | 12/1996 | Gregory, Jr. et al. | 358/537 |
| 5,606,365 | 2/1997 | Maurinus et al. | 348/222 |
| 5,634,092 * | 5/1997 | Stokes | 345/431 |
| 5,649,220 * | 7/1997 | Yosefi | 707/526 |

(List continued on next page.)

FOREIGN PATENT DOCUMENTS

| | | | |
|---|---|---|---|
| 0 144 188 | 11/1984 | (EP) . | |
| 0 501 942 | 2/1992 | (EP) . | |
| 469851 | 2/1992 | (EP) . | |
| 712096 A2 * | 5/1996 | (EP) | G06T/11/60 |
| 712096 | 5/1996 | (EP) | G06T/11/60 |
| 718796 A2 * | 6/1996 | (EP) | G06T/11/60 |
| 718796 | 6/1996 | (EP) | G06T/11/60 |
| 843284 A2 * | 5/1998 | (EP) | G06T/11/60 |
| 878956 | 11/1998 | (EP) | H04N/1/21 |
| 878956 A1 * | 11/1998 | (EP) | H04N/1/21 |
| 2590-042 | 11/1985 | (FR) . | |
| 62-273970 | 10/1987 | (JP) . | |
| WO 94/22101 | 9/1994 | (WO) . | |

OTHER PUBLICATIONS

"New Paradigms for Visualizatoin" Murch, G.M., COMP-CON Spring '90: Thirty–Fifth IEEE Computer Society International Conference, Intellectual Leverage, Digest of Papers. (Cat. No. 90CH2843–1) pp. 550–551.

Primary Examiner—Mark R. Powell
Assistant Examiner—Jeffrey Allen Rossi
(74) Attorney, Agent, or Firm—Faegre & Benson LLP

(57) ABSTRACT

The present disclosure involves modifying digital image files, involving modifying a low resolution proxy and recording a script which is then applied to the original digital image file. The transfer of a low resolution proxy and/or modification script allows the use of inexpensive, standard data transmission components, allowing successful access to expert services previously only available to those with the costly data transmission components.

21 Claims, 14 Drawing Sheets

U.S. PATENT DOCUMENTS

| | | | |
|---|---|---|---|
| 5,737,491 | * 4/1998 | Allen et al. | 396/283 |
| 5,764,980 | 6/1998 | Davis et al. . | |
| 5,774,599 | 6/1998 | Muka et al. . | |
| 5,781,908 | * 7/1998 | Williams et al. | 707/104 |
| 5,790,708 | * 8/1998 | Delean | 382/302 |
| 5,801,843 | 9/1998 | Overton . | |
| 5,805,723 | 9/1998 | Fujiwara . | |
| 5,809,179 | 9/1998 | Marimont et al. . | |
| 5,822,458 | 10/1998 | Silverstein et al. . | |
| 5,838,821 | 11/1998 | Matsubara et al. . | |
| 5,907,640 | * 5/1999 | Delean | 382/302 |
| 5,926,288 | * 7/1999 | Dellert et al. | 358/487 |
| 5,949,551 | * 9/1999 | Miller et al. | 358/408 |
| 5,995,679 | * 11/1999 | Riegel | 382/284 |
| 6,011,547 | * 1/2000 | Shiota et al. | 345/327 |
| 6,134,606 | * 10/2000 | Anderson et al. | 709/228 |
| 6,167,382 | * 12/2000 | Sparks et al. | 705/26 |
| 6,181,836 | * 1/2001 | Delean | 382/302 |
| 6,202,073 | * 3/2001 | Takahashi | 345/118 X |
| 6,208,770 | * 3/2001 | Gilman et al. | 382/305 |
| 6,211,974 | * 4/2001 | Haneda | 358/527 |

* cited by examiner

REMOTE MODIFICATION OF DIGITAL IMAGES USING SCRIPTS

BACKGROUND OF THE INVENTION

I. Field of the Invention

This invention relates generally to the modification of digital image files. More particularly, the present invention relates to an apparatus and method for modifying high resolution digital images generated at an origination site which involves transmitting a compressed low resolution proxy of a high resolution digital image to a remote site where it can be decompressed and modified by a digital image expert, and wherein the modifications are saved in a script file which is retransmitted back to the origination site such that it can be applied to the high resolution digital image to produce a corrected high resolution digital image.

II. Discussion of the Prior Art

Digital images files are often generated at one location and modified, adjusted, corrected or made ready for use at a different site. Traditionally the process begins with the generation of a high resolution digital image file at an image origination site. Image origination sites may include, but are not necessarily limited to, photo studios with a digital camera, design firms with desktop scanners, or photo labs having CD image facilities. Once generated at an image origination site, the high resolution digital image file is transferred to a "color trade shop" at an image modification site remote from the image origination site where a "color" expert performs the necessary corrections and prepares the image for printing, multimedia or internet use. The corrections or adjustments made to the file may include, but are not limited to, exposure correction, neutralizing color casts, optimization of reproduction range, image silhouetting, color alteration, retouching and color space conversion.

Transferring the high resolution digital image file to the image modification site may be performed in one of a variety of well known methods. A first transfer method is via high speed digital data transmission lines such as, but not limited to, T1 or ISDN. While this transfer method is fast, it is nonetheless disadvantageous in that it is very costly. A second transfer method is via traditional modem and telephone line. This method offers a low cost of implementation, but is extremely slow and unreliable due to long transmission times. A third transfer method is via courier/overnight mail services which, as will be appreciated, is expensive and far slower than digital data transmission.

Transmission via an intranet network may also be employed where the "color trade shop" facility is part of the same organization as the image generator, such as where a large corporation has both image generation and image correction operations. However, transferring high resolution digital image files is slow "point to point" within the network and oftentimes results in an overall network slow down. This disadvantageously affects all those connected to the network, including those not involved in digital image transfer.

Once received at the image modification site, the high resolution digital image file can be corrected, adjusted, or modified in any number of desired fashions. These modifications can be performed by a "color" expert on an image-by-image basis. However, working with the high resolution digital image file in this fashion is labor intensive for the "color" expert and therefore time consuming and inefficient. Modifications may also be performed in an automated fashion by applying a "script" of predetermined instructions to the high resolution digital image file to modify the image in a set fashion with little to no need for human intervention. While scripting is more efficient than having a color expert perform the modifications, a drawback exists in that this modification technique is only helpful when batch processing a plurality of images sharing similar characteristics. Rarely, however, do files require the exact same corrections for optimization such that not all problems are corrected accurately.

Whether modified manually by the color expert or automatically via scripting, the newly adjusted full resolution digital image file typically increases in size by as much as 25–30%. As will be appreciated, increasing the size of the high resolution digital image file exacerbates the problem of slow transmission when electronically transferring the corrected high resolution digital image file back to the image origination site.

While color trade shops may not face financial and/or technological limitations, the image generator frequently does. Often a color trade shop has hardware designed to enhance the productivity of the large clients, yet, due to the expense required at both ends, nothing is currently being done to address the small client.

A need therefore exists for a method and system for modifying high resolution digital images which is economical, faster, and more universally available than is currently offered in the prior art.

The present invention is directed at overcoming, or at least reducing the effects of, one or more of the problems set forth above.

SUMMARY OF THE INVENTION

In accordance with a broad aspect of the present invention, a method is provided for modifying a digital image file. The method comprises the steps of: (a) electronically transferring from a first location to a second location a compressed low resolution proxy file representing a high resolution digital image; (b) decompressing the compressed low resolution proxy file at the second location to produce a restored low resolution proxy file; (c) performing one of a plurality of image correction modifications on the restored low resolution proxy file; (d) saving instructions representing the modifications performed in step (c) as a script file; and (e) electronically transferring from the second location to the first location the script file such that the script file may be applied to the high resolution digital image to produce a corrected high resolution digital image.

In accordance with another broad aspect of the present invention, a method of modifying a digital image file is provided comprising the steps of: (a) creating at a first location a low resolution proxy file of a high resolution digital image; (b) compressing the low resolution proxy file to produce a compressed proxy file; (c) transmitting the compressed proxy file to a remote site; (d) decompressing the compressed proxy file at the remote site to restore the low resolution proxy file; (e) modifying the restored low resolution proxy file at the remote site to generate a script of modifications; (f) transmitting the script of modifications to the first location; and (g) applying the script of modifications to the high resolution digital image at said first location to produce a corrected high resolution digital image.

In a still further broad aspect of the present invention, a system is provided for modifying a digital image file. The system includes a first computing station disposed at a first location, a second computing station disposed at a second location, and a communication system cooperatively coupled between the first and second computing stations.

The first computing station includes a processor programmed to produce a proxy file representing a high resolution digital image file. The second computing station includes a processor programmed for decompressing the proxy file to produce a decompressed digital image file, for performing one of a plurality of digital image modifications on the decompressed digital image file, and for generating a script file representing the digital image modifications performed on the decompressed digital image file. The communication system is for transferring the proxy file from the first computing station to the second computing station and for transferring the script file from the second computing station to the first computing station such that the script file can be applied to the high resolution digital image file to create a corrected high resolution digital image file.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
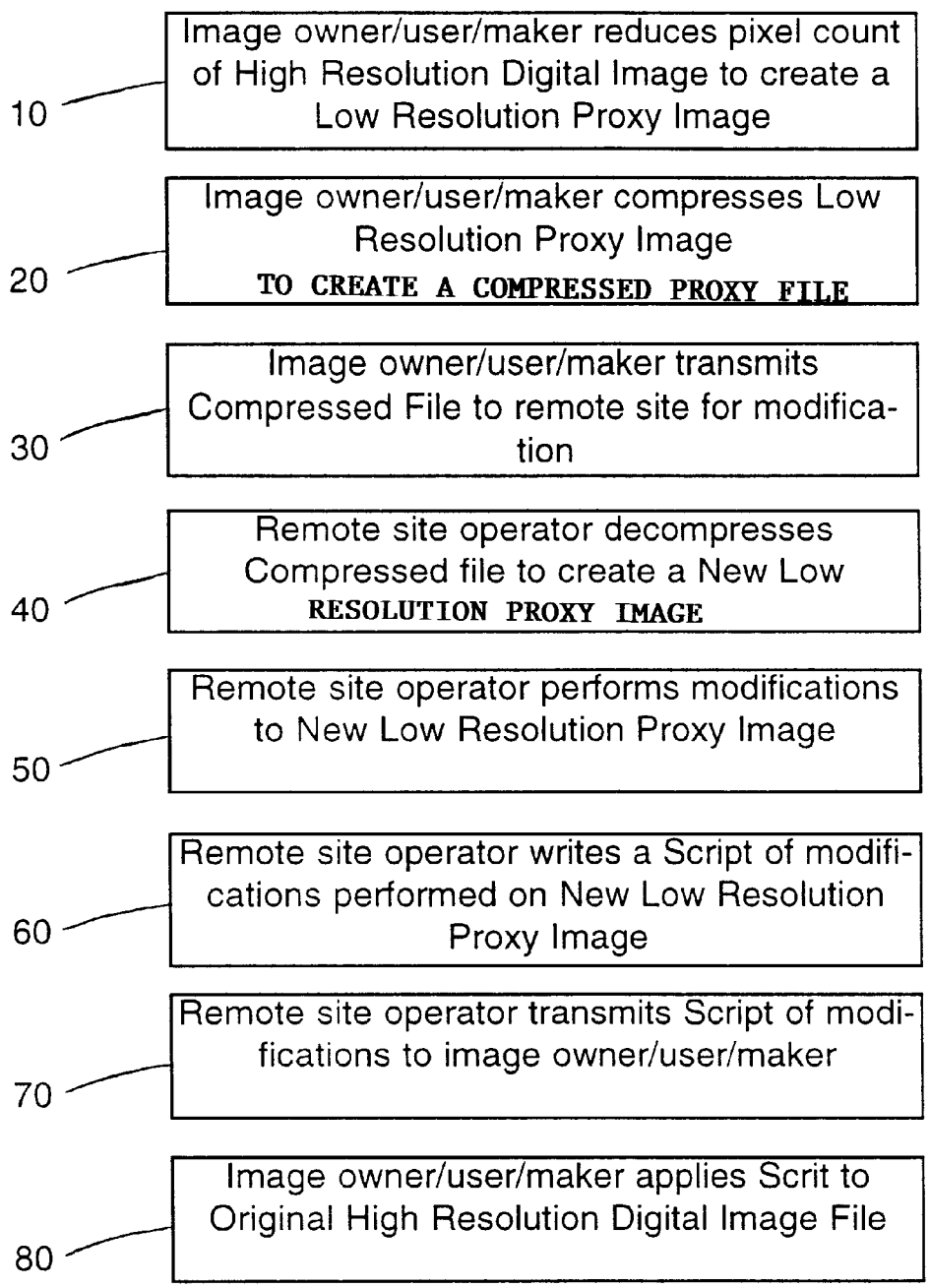
FIG. 1 is a flow chart illustrating a method of modifying digital images in accordance with the present invention.

Referring initially to FIG. 1, shown is a flow chart illustrating a method of modifying digital images in accordance with the present invention. The digital images to be modified are high resolution images saved in digital media, hereinafter referred to as "high resolution digital image files." The high resolution digital image files may be generated at any number of a variety of image origination sites, including but not limited to, photo studios having digital photographic equipment, design firms having desktop scanning capabilities, or photo labs having compact disk (CD) image generation facilities.

The first step 10 in the method of the present invention involves reducing the pixel count of the high resolution digital image file at the image origination site to create a low resolution proxy file of the high resolution digital image file. If desired, various other dimensions of the digitized image may be scaled down, such as the height and width. As will be discussed in greater detail below, this can be accomplished using any number of commercially available image correction software applications, including but not limited to Photoshop by Adobe Systems, Inc. of San Jose, Calif., Linocolor by Heidelberg Color Publishing Solutions, Inc. of Hauppauge, N.Y., Live Picture by HCS Software, Inc. of Santa Monica, Calif., and Photoscripter by Main Event Software, Inc. of Washington, DC.

The terms "high resolution" and "low resolution" are, by definition, relative. It is therefore to be readily understood that the high resolution and low resolution files referred to herein may vary greatly in size and, in some instances, overlap. For example, a high resolution file of an image to be printed in a 2"×2" in a catalog may be approximately 1.5 MB (1,500,000 bytes), while a low resolution file of a painting ready for print at 30"×40" scale may be approximately 5 MB (5,000,000 bytes). This being said, in one embodiment of the present invention, the term "high resolution" is defined as comprising a digital image having a pixel count in the range of approximately 1 MB (1,000,000 bytes) to 1 GB (1,000,000,000 bytes), while the term "low resolution" is defined as comprising a digital image having a pixel count in the range of approximately 500K (500,000 bytes) to 5 MB (5,000,000 bytes). It is to be noted, however, that these pixel count ranges are not critical to the present invention and, consequently, may vary widely (higher or lower) without departing from the scope of the present invention.

The second step 20 involves compressing the low resolution proxy file to produce a compressed proxy file. The low resolution proxy may be compressed using any number of commercially available compression techniques, such as those found within any number of the aforementioned commercially available image correction software packages. As used herein, the terms "compression" or "compressing" are used to denote the process of subjecting the low resolution proxy file to a compression algorithm to further reduce the file size and place it in a compression format such as, but not limited to, JPEG, LZW and FlashPix. The particular compression algorithm selected may vary depending upon the properties of the digital image to be reduced and, similarly, the size of the compressed proxy file may vary widely depending upon the size of the low resolution proxy file. In one embodiment, the term "compressed proxy file" is defined as comprising a digital file having a pixel count in the range of approximately 100K (100,000 bytes) to 700K (700,000 bytes). A benefit of compressing the low resolution proxy file is that the resulting compressed proxy file, being of reduced size, can be transmitted electronically from the image origination site to an image correction site in a much faster and easier fashion than is otherwise possible when transmitting a high resolution digital image.

The third step 30 in the method of the present invention involves transmitting the compressed proxy file to an image correction site. In a preferred embodiment, the step of transmitting the compressed proxy file to the image correction site is conducted electronically which, as noted above, takes advantage of the small size of the compressed proxy file for reduced transmission times. It may also be desirable to transfer a job ticket along with the compressed proxy file which enumerates for the image correction specialist the corrections and/or image conditions desired on the part of the image generator. Depending upon the location of the image correction site, the compressed proxy file may be transmitted via modem, intranet, internet, T1 lines, or any number of now-available or later-developed technologies for transporting such a compressed proxy file. In other words, the image origination site and image correction site may be in separate geographic locations or the same geographic location, so long as each site can be communicatively linked with the other for transmitting images and/or image correction information back and forth.

The fourth step 40 involves decompressing the compressed proxy file at the remote site to create a restored low resolution proxy file. This decompression function may be accomplished via the chosen image correction software application. In a preferred embodiment, the restored low resolution proxy file will have the same approximate size characteristics as the low resolution proxy file generated in the first step 10, although the file size of the restored proxy file may vary following restoration without departing from the scope of the present invention. If a job ticket is transmitted along with the compressed proxy file, it too will be opened up at the image correction site to instruct the image correction specialist of any changes or modifications requested by the image generator.

The fifth step 50 involves performing any of a variety of modifications on the restored low resolution proxy file. In a preferred embodiment, these modifications are performed by an image correction specialist to prepare the digital image for printing, multimedia or internet use. The corrections or adjustments made to the file may include, but are not limited to, exposure correction, neutralizing color casts, optimization of reproduction range, image silhouetting, color alteration, retouching and color space conversion. The script file may be recorded in any number of commercially available color applications including, but not limited to, Photoshop, Live Picture, Linocolor, and PhotoScripter.

The sixth step 60 involves saving the settings or modifications performed in step 50 as a script file. As used herein, the term "script file" is defined as a file containing the list of instructions representing the modifications performed by the image correction specialist. For example, a script file may include any number of image correction instructions, including but not limited to: set print preferences, tonal adjustments, color cast correction, unsharp mask filtration, convert color space, selective color correction, generate work path to isolate areas, save path as clipping path, and save file in correct file format. It is also to be understood that the "script file" may comprise any single instruction from the before mentioned list saved as an independent setting. The script file may range from 100 bytes to 9K (9,000 bytes) which, as will be appreciated, is relatively small in size compared to a high resolution digital image file. The size of the script file may vary from the above-identified ranges without departing from the scope of the invention.

The seventh step 70 of the present invention involves transmitting the script file from the image correction site back to the image origination site. In a preferred embodiment, the step of transmitting the script file to the image origination site is conducted electronically. Due to the small size of the script file, it may be transmitted back to the image origination site in a quick and easy fashion, especially relative to the transfer of a high resolution digital image file. As with the transfer of the compressed proxy file, the script file may be transmitted to the image origination site via modem, intranet, internet, T1 lines, or any number of now-available or later-developed technologies for transporting such a script file.

The final step 80 in the method of the present invention involves applying the script file to the high resolution digital image file to create a corrected high resolution digital image file. This is performed by playing the script file using the image correction software on the computing station at the image origination site. In a preferred embodiment, the high resolution digital image file will be immediately modified on the display in front of the image generator when the script file is played. In an important aspect of the present invention, this step can be performed by anyone at the image origination site regardless of their training or expertise in digital image correction. This is because the individual at the image origination site need only invoke the script file using the given image correction software. By applying the script file to the original high resolution digital image file, the same modifications that were specifically performed by the image correction specialist at the image correction site will be automatically performed at the image origination site to produce a corrected high resolution digital image file of professional quality. The corrected high resolution digital image file is then ready for use as desired.

The present invention advantageously provides the ability to have any operator, lay or otherwise, perform the required image modifications to the original high resolution digital image file without actually transmitting it to the image correction site. This is important in that, by eliminating the need to transmit the high resolution digital image file, the transmission time is drastically reduced. Moreover, the image origination site does not need sophisticated data transmission facilities because the compressed proxy file and the script file, being much smaller than the high resolution digital image file, can be readily transmitted using standard, relatively inexpensive transmission devices. As will be appreciated, this minimizes the overall cost of undertaking such image correction operations such that any entity, large or small, can compete without undue financial hardship. In this fashion, the present invention overcomes the drawbacks of the prior art image correction operations.

Referring now to FIGS. 2–8, an exemplary embodiment of the foregoing method will now be described. FIGS. 2–8 are screen displays or windows as may be displayed to a user on a computer system running one of the various commercially available image correction software packages that can be used in accordance with the present invention. In the following example, the image correction software package is Photoshop (offered by Adobe Systems, Inc. of San Jose, Calif. operating on a Apple Power Macintosh system consisting of a monitor, CPU, hard drive, keyboard, and mouse).

Figure 2:
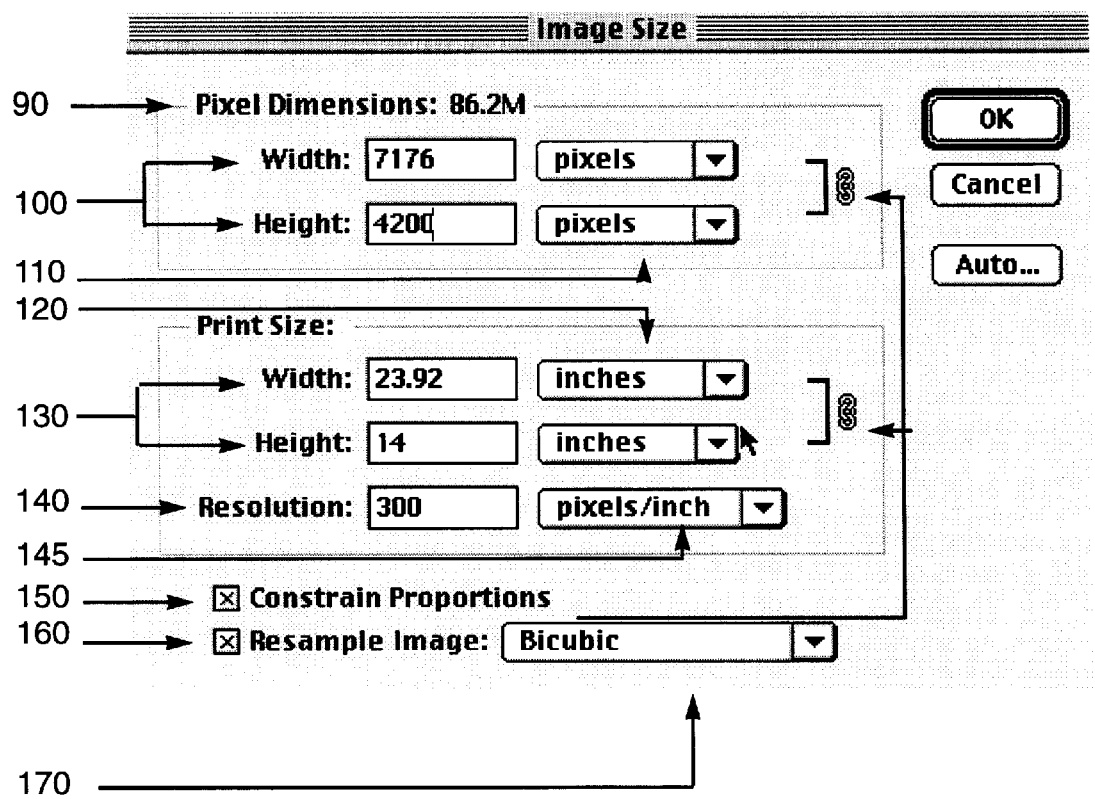
FIG. 2 is a screen display illustrating the dimensions of a high resolution digital image file to be modified in accordance with the present invention.

FIG. 2 is a screen display illustrating the dimensions of a high resolution digital image file to be modified in accordance with the present invention. Pixel Dimensions 90 displays the gross pixel count of a specified file. In the exemplary embodiment, the pixel count is that of the high resolution file, seen here as 86.2 MB (86,000,000 bytes approx.). Width and Height 100 displays the width as the actual number of pixel columns (7176) and the height as the actual number of pixel rows (4200). This information provides the user an understanding of the proportionate distribution of data contained in the gross pixel count. Scale adjustments may be made to the digital image file by entering alternate desired values (pixel columns or pixel rows) in the width and height boxes. Pulldown menu 110 allows for the selection of various measuring units for the width and height, either pixel as in the exemplary embodiment or percent. Therefore, if the pull down menus 10 are set to percent, the scale of the digital image file may be adjusted based upon percentage values entered for the width and height.

A pulldown menu 120 offers unit of measure options in the "Print Size" portion of the window. In the exemplary embodiment, the chosen unit of measure is "inches," although other unit of measure options include: centimeters, points, picas, columns and percent. Width and Height 130 are text windows displaying the output dimensions of the exemplary high resolution digital image file. Width is shown as 23.92 inches and height is shown as 14 inches, based upon resolution values entered in 140 and units defined in 145. (In the exemplary embodiment, the high resolution digital image file has 7176 columns and 4200 rows which when divided by the output resolution of 300 pixels/inch provides the width dimension of 23.92 inches and a height dimension of 14 inches.) These dimensions may be adjusted to alter image scale by simply entering alternate values for the height and width. The Resolution window 140 displays the output pixel count, in this example, 300 per inch. Another pulldown menu 145 in the Print Options section of the window offers the choice of, pixels/inch as used in the exemplary embodiment, or pixels/centimeter. The Constrain Proportions "check box" 150 enables a user to lock the proportions of a file when adjusting values in any of the above text windows (height/width/resolution) found in the "Print Size" section. In "checking" this box, when a single dimension (width or height) is altered the corresponding dimension (width or height) is adjusted accordingly. Unchecked, this box allows for alteration of a single dimension, independent of the other. A resample image "check box" 160 determines whether a file is resampled as adjustments are made to the dimensions/resolution values of the file. Resampling the file will increase or decrease the quantity of information contained in the gross pixel dimension while either the height/width dimensions or the resolution remain constant. A pulldown menu 170 offers three different methods for resampling the image. In the exemplary embodiment bicubic resampling is the method used while other resampling options include nearest neighbor or bilinear.

Once again, it is to be readily understood that the dimensions of this high resolution digital file are set forth by way of example only and may vary greatly from that shown without departing from the scope of the present invention.

Figure 3:
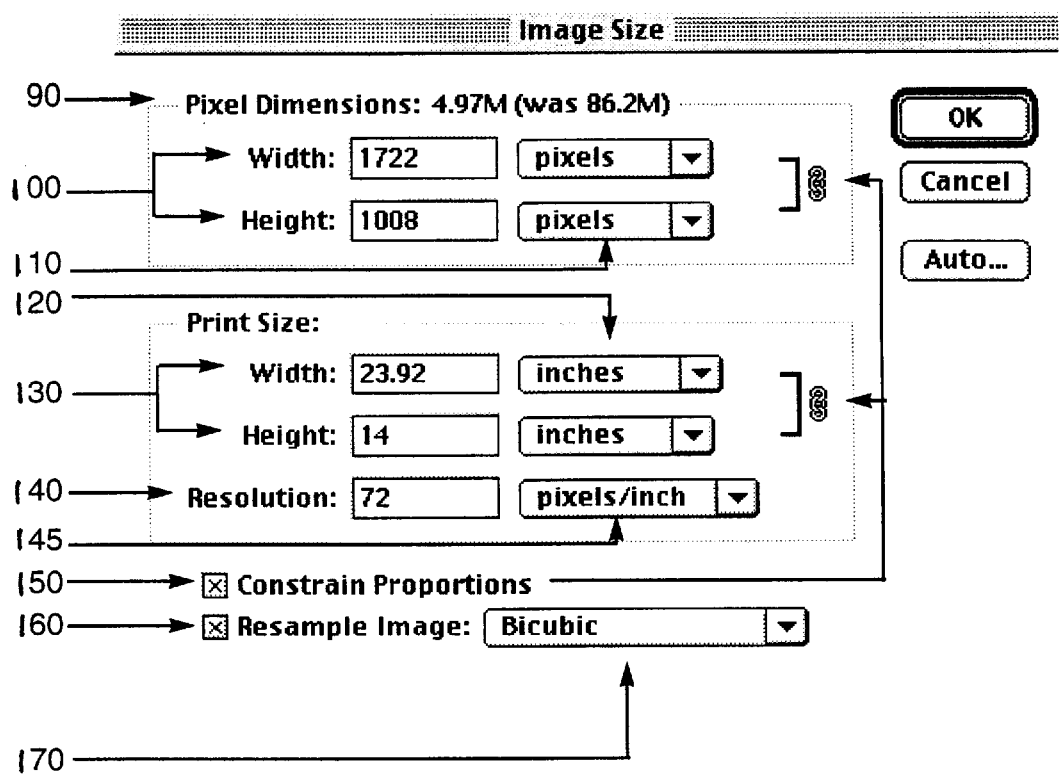
FIG. 3 is a screen display illustrating the dimensions of a low resolution proxy file based on the high resolution digital image file from FIG. 2.

Referring to FIG. 3, shown is a screen display illustrating the dimensions of a low resolution proxy file based on the high resolution digital image file from FIG. 2. In this example, the low resolution proxy file remains dimensionally the same at 23.92"×14", while the pixel count is reduced to a standard monitor resolution of 72 pixels/inch and the byte size is decreased dramatically to 4.97 MB (4,970,000 bytes approx.). Skilled artisans will appreciate that the dimensions of this low resolution digital file may vary greatly from that shown without departing from the scope of the present invention.

Pixel Dimensions 90 displays the gross pixel count of a specified file. In the exemplary embodiment, the pixel count is that of the low resolution proxy file, 4.97 MB (4,970,000 bytes approx.) generated from the sample high resolution file, originally 86.2 MB (86,200,000 bytes approx.). The Width and Height windows 100 in this embodiment display the actual number of pixel columns (1722) and pixel rows (1008) of the low resolution proxy file. Width, having been reduced from 7176 columns to 1722 columns and height, formerly 4200 rows now 1008 rows, provides the new distributed representation of the gross pixel count of the low resolution proxy. A pulldown menu 110 allows for the selection of measuring units, either pixel as seen in the exemplary embodiment or percent.

Width and Height windows 130 display the output dimensions of the sample low resolution proxy file. Height is shown as 23.92 inches and width is shown as 14 inches, based upon resolution values entered in 140 and units defined in 145. (In the exemplary embodiment, the low resolution proxy file has 1722 columns and 1008 rows which when divided by the revised output resolution of 72 pixels/inch provides the width dimension of 23.92 inches and height dimension of 14 inches.) The Resolution window 140 displays the output pixel count, in the exemplary embodiment, 72 per inch.

It is to be readily understood that the dimensions of this low resolution proxy file may vary greatly from that shown without departing from the scope of the present invention. It should be appreciated that in reducing the high resolution file, originally 86.2 MB, to 4.97, thus creating the low resolution proxy, only the value entered in the resolution window was altered, going from 300 pixels per inch to 72 pixels per inch.

Figure 4:
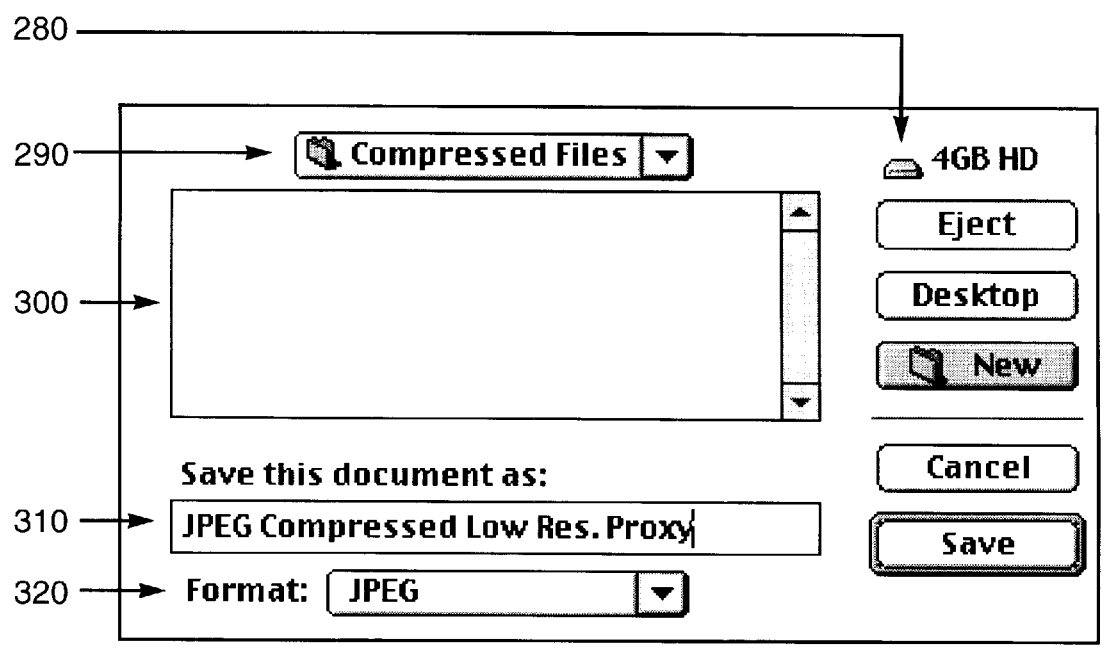
FIG. 4 is a screen display illustrating a function for compressing the low resolution proxy file in accordance with the present invention.

Referring to FIG. 4, shown is a screen display illustrating a function for compressing the low resolution proxy file in accordance with the present invention. When saving the low resolution proxy file, a compression format is selected from a variety of available compression formats. In this example, JPEG is the selected compression format, which in turn offers various levels as seen in FIG. 5.

An icon 280 defines the location of the folder to which the compressed file is being saved. The title bar of a pulldown menu 290 contains the name of the folder to which the compressed low resolution proxy file will be saved which in this embodiment is a folder entitled "Compressed Files." Options from this pulldown menu 290 include any storage location available the computer at the time of compression, including but not limited to hard drives, removable media and network servers. A window 300 displays the contents of what is contained in the folder or defined drive(s) selected and listed in the title bar of the pulldown menu 290. (In the exemplary embodiment the folder contains no items.) A text box 310 is provided for titling the file being compressed and saved. In this example the file being compressed bears the title "Low Resolution Proxy File." The pulldown menu 320 allows for the selection of one of many different file formats, including compression formats. Format choices found in this pulldown menu may include, but are not limited to, JPEG, Flashpix, GIF and PICT.

Figure 5:
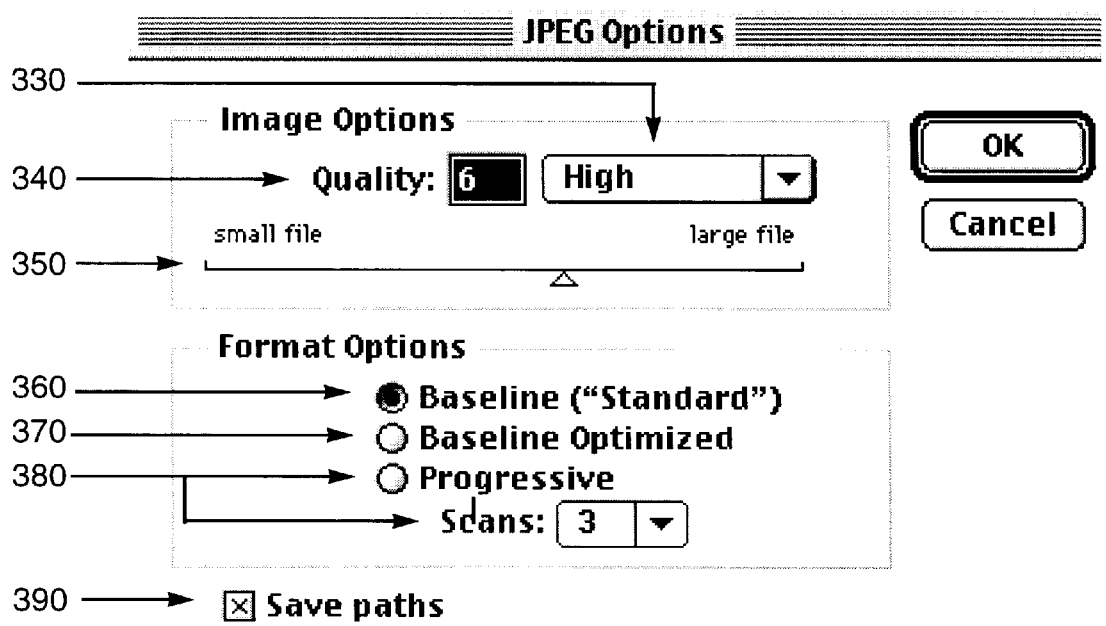
FIG. 5 is a screen display illustrating the compression options available when saving a file under JPEG compression.

With continued reference to FIG. 5, shown is a screen display illustrating the compression options available under the JPEG compression function. It should be noted that certain compression algorithms do not provide choices similar to those seen in FIG. 4, but rather use a single level of compression by default.

A pulldown menu 330 within the "Image Options" window includes four options: "Maximum," "High," "Medium," and "Low." "Maximum" represents the least compressed or highest quality file. "Low" represents the most compressed or lowest quality file. "Medium" represents a file of intermediate compression and quality. The "Quality" selection box 340 in the Image Options window denotes a scale of 0 to 10, wherein 0 represents the lowest quality (i.e. the most compressed or smallest) file, and wherein 10 represents the highest quality (i.e. the least compressed or largest) file. The slider scale 350 in the "Image Options" window shows a continuum from "small file" to "large file," wherein "small file" represents the lowest quality (i.e. the most compressed or smallest) file and "large file" represents the highest quality (i.e. the least compressed or largest) file. It should be noted that adjustment to any of the above mentioned "Image Options" could possibly alter one or both of the other "Image Options." The choice of which option to select may be based upon speed of use or desired quality with greater attention and finer tuning available through the Quality window. In the "Format Options" window, the Baseline option 360 selects the standard or original JPEG compression algorithm method which as seen in this embodiment. The Baseline Optimized option 370 selects a more recent compression method that maintains a greater degree of color integrity. The Progressive option 380 selects a file type designed for display in a web browser using multiple passes or scans, with each one increasingly higher in resolution, with the number of alternate resolutions entered into the Scans window 380. The Save Paths "check box" 390 allows for a path to be saved with the file. A path is designed to isolate a specific portion of an image.

Figure 6:
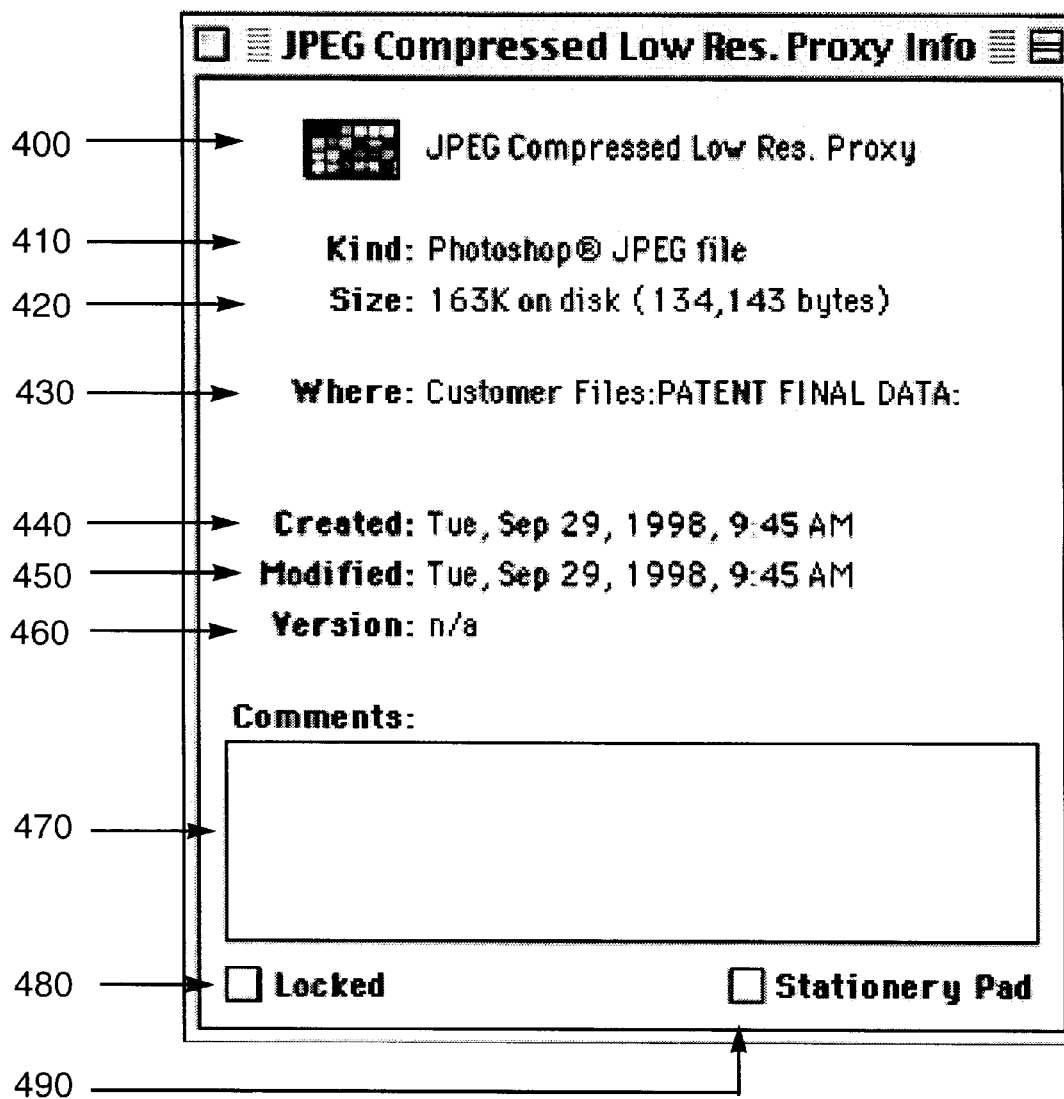
FIG. 6 is a screen display illustrating an information window noting the file size information of the compressed low resolution proxy image.

Referring to FIG. 6, shown is a screen display illustrating an information window noting the file size information of the compressed low resolution proxy image. In this example, the low resolution proxy when compressed according to the sample information provided in FIG. 4 and FIG. 5 now becomes a 204K file (134,143 bytes). The high resolution image has been scaled and compressed from 86 MB to 204K, taking the optimal transfer time, based on a 56K modem operating in a vacuum, from 26 minutes to 4 seconds.

A thumbnail icon 400 of the file is provided, along with the title of the file which, in this embodiment, is "Low Resolution Proxy Image." Kind 410 provides the user with information pertaining to the file format. In this example, the file format is Photoshop JPEG. Size 420 provides the user with information pertaining to the quantity of information contained in the file mentioned in 400. In this example, the file contains 163K or 134,143 bytes of information. Where 430 provides the user with information as to where the file listed in 400 currently resides. Created 440 provides the user with information as to when the compressed file mentioned in 400 was first compressed and saved. In this example, the date of creation is Tuesday, Sept. 29, 1998 at 9:45 AM. Modified 450 provides the user with information as to when the compressed file mentioned in 400 was last altered or saved. In this example, the date is Tuesday, Sep. 29, 1998 at 9:45 AM. (When the modification time/date match the creation date exactly a modification is often not involved.) Version 460 provides the user with information as to which version was used. In this example, the information is not available. Comments 470 provides the user with a text window in which information or comments regarding the file may be entered and stored with the file. The Lock "check box" 480 allows the user to "lock" the file, preventing further changes to the file from being saved under the same file name. The Stationary Pad "check box" 490 enables the user to generate a "stationary pad" file. Said "stationary pad" file is a copy of the original file on which any modifications are performed. These modifications will affect only the copy, or stationary pad file, leaving the original undisturbed.

Figure 7A:
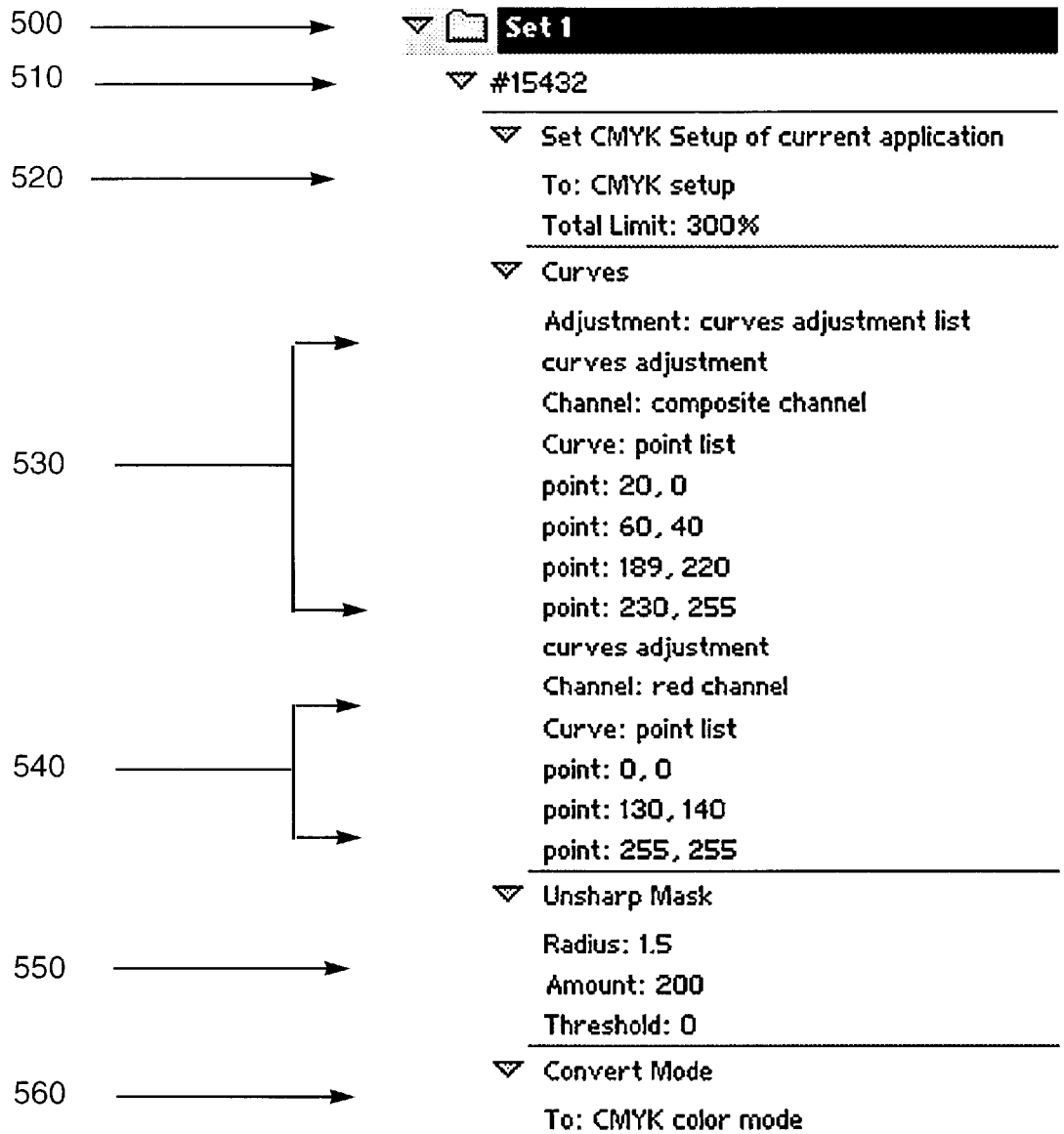
FIGS. 7A and 7B collectively form a screen display illustrating a sample script for performing various modifications to correct a specific file in accordance with the present invention.
Figure 7B:
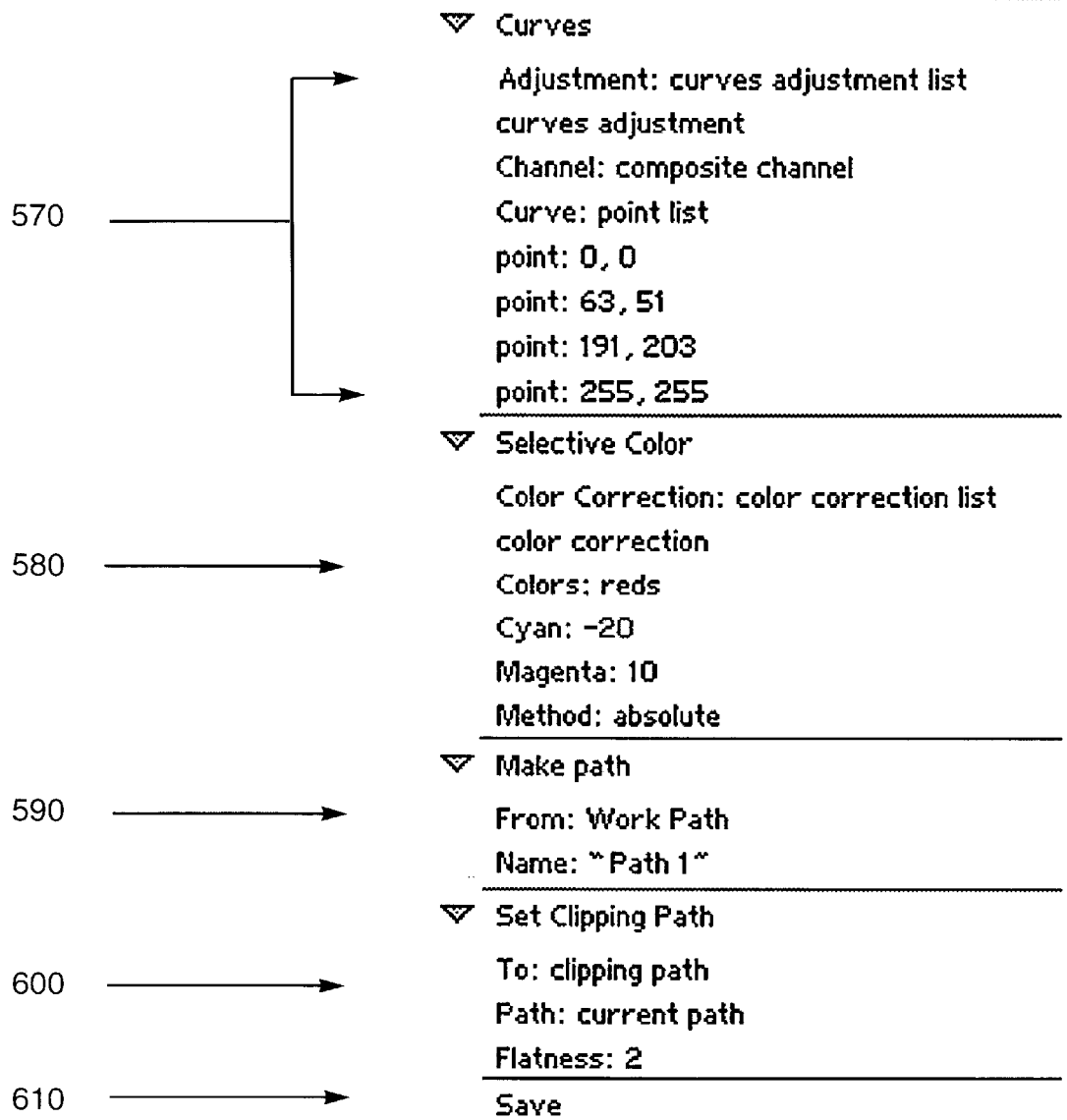

FIGS. 7A & 7B collectively illustrate a sample script that performs certain functions to correct a specific file. The script includes, by way of example only, a Set CMYK Setup section, a first Curves section, an Unsharp Mask section, a Convert Mode section, a second Curves section, a Selective Color section, a Make Path section, a Set Clipping Path section, and a Save section. It is understood that the adjustments made in the exemplary embodiment are known to those skilled in the art.

Reference numeral 500 represents a defined folder in which the script is saved. The title or name 510 of the script created (#15432 in the exemplary embodiment). The Set CMYK Setup section 520 is provided to set the Cyan, Magenta, Yellow, Black transform of the current application. In the embodiment shown, the preference set for converting files into a specific printing environment is set to UCR, indicating Under Color Removal will be applied, as opposed to GCR (gray component replacement) with a 300% total ink limit allowed. The first Curves section 530 calls out the various adjustments to be performed in the curves palette based upon the needs of the decompressed low resolution proxy file. These include adjustments of the tonal range in the red-green-blue color spectrum, such as a Shadow Adjust from a value of 0 to 20, Adjust ¼ Tone from a value of 40 to 60, Adjust ¾ Tone from a value of 220 to 189, Adjust Highlight from a value of 255 to 230. Channel 540 compensates for a color cast or imbalance requiring a midtone adjustment from a value of 130 to 140 made in the red channel. The Unsharp Mask section 550 documents the image sharpening functions using an unsharp mask filter. In this embodiment, Pixel Radius is set at 1.5, Amount is set at 200, and Threshold is set at 0. The Convert Mode section 560 documents any conversions in the color space of the decompressed low resolution proxy file. In this embodiment, the color space is converted from RGB to CMYK. The second Curves section 570 calls out the various adjustments of the tonal range in the CMYK color space. In this embodiment, these adjustments include Adjust ¼ Tone from a value of 51 to 63 and Adjust ¾ Tone from a value of 203 to 191.

The Selective Color section 580 documents the color correction adjustment to be performed on the decompressed low resolution proxy file. In this embodiment, these adjustments include, Color designated as red, with Cyan being removed at a value of −20 and Magenta being added at a value of 10. The Make Path section 590 documents a path constructed using the pen tool to isolate/silhouette an area from it's background. The Set Clipping Path section 600 documents a path saved as a clipping path enabling the isolated portion of the image to be placed in a page layout program. The Save section 610 represents that the image is to be saved in the correct file format after the above mentioned tasks are performed.

Figure 8:
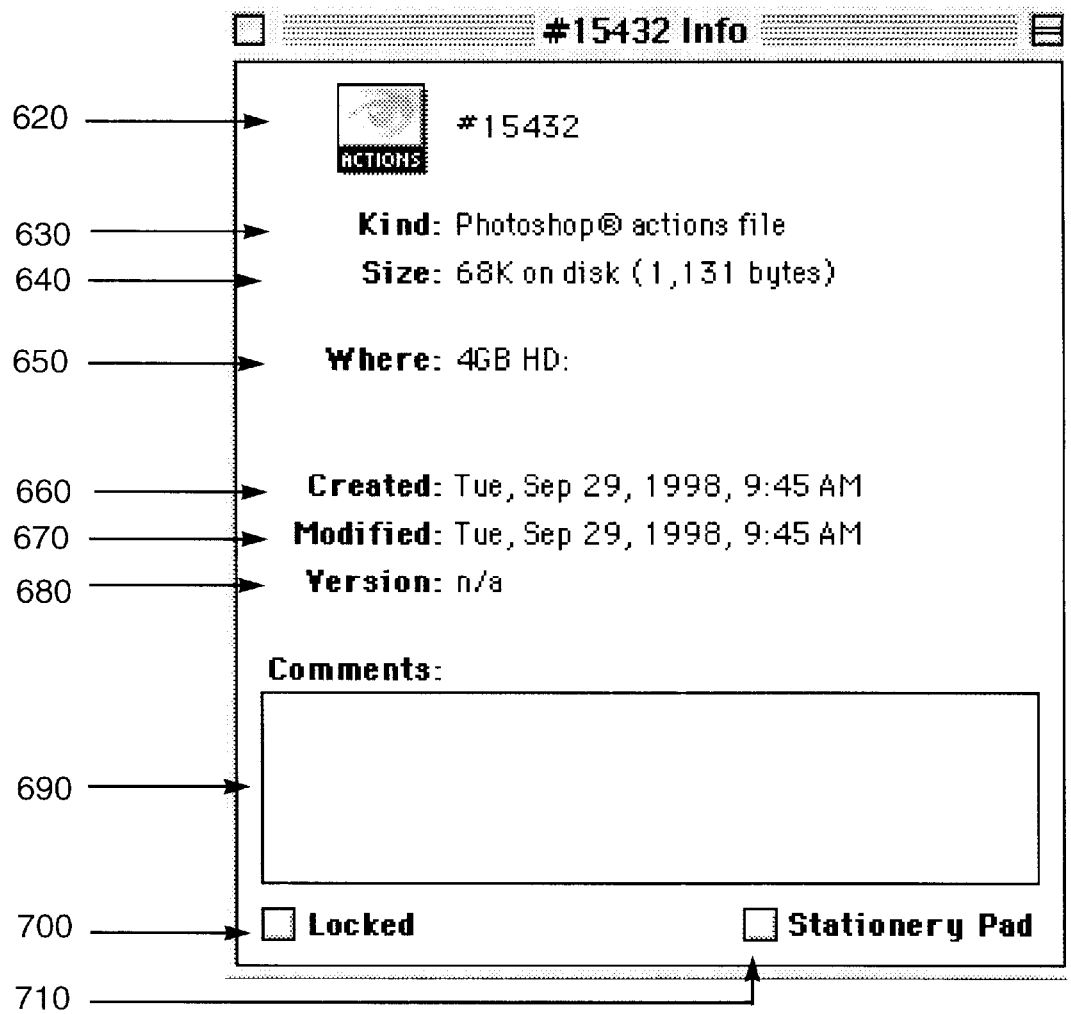
FIG. 8 is a screen display illustrating an information window noting the file size of the correction script.

FIG. 8 illustrates a screen display of an information window for the script file shown in FIGS. 7 A&B. A thumbnail 620 of the Script file is provided, along with the title of the file which, in this embodiment, is "#15432." Kind 630 provides the user with information pertaining to the file format. In this example, the file format is Photoshop actions file. Size 640 provides the user with information pertaining to the quantity of information contained in the file mentioned in 620. In this example the file contains 68K or 1131 bytes of information. Where 650 provides the user with information as to where the file listed in 620 currently resides. In the exemplary embodiment the file is found on the hard drive titled "4 GB HD". Created 660 provides the user with information as to whether the compressed file mentioned in 620 was first compressed and saved. In this example, the date of creation is Tuesday, Sep. 29, 1998 at 9:45 AM. Modified 670 provides the use with information as to when the compressed file mentioned in 620 was last altered or saved. In this example, the date is Tuesday, Sep. 29, 1998 at 9:45 AM. (When the modification time/date match the creation date exactly a modification is often not involved.) Version 680 provides the user with information as to which version was used. In this example, the information is not available. Comments 690 provides the user with a text window in which information or comments regarding the file may be entered and stored with the file. In the exemplary embodiment, their are no comments. The Lock "check box" 700 allows the user to "lock" the file, preventing further changes to the file from being saved under the same file name. The Stationary Pad "check box" 710 enables the user to generate a "stationary pad" file. Said "stationary pad" file is a copy of the original file on which any modifications are performed. These modifications will affect only the copy, or stationary pad file, leaving the original undisturbed.

Figure 9:
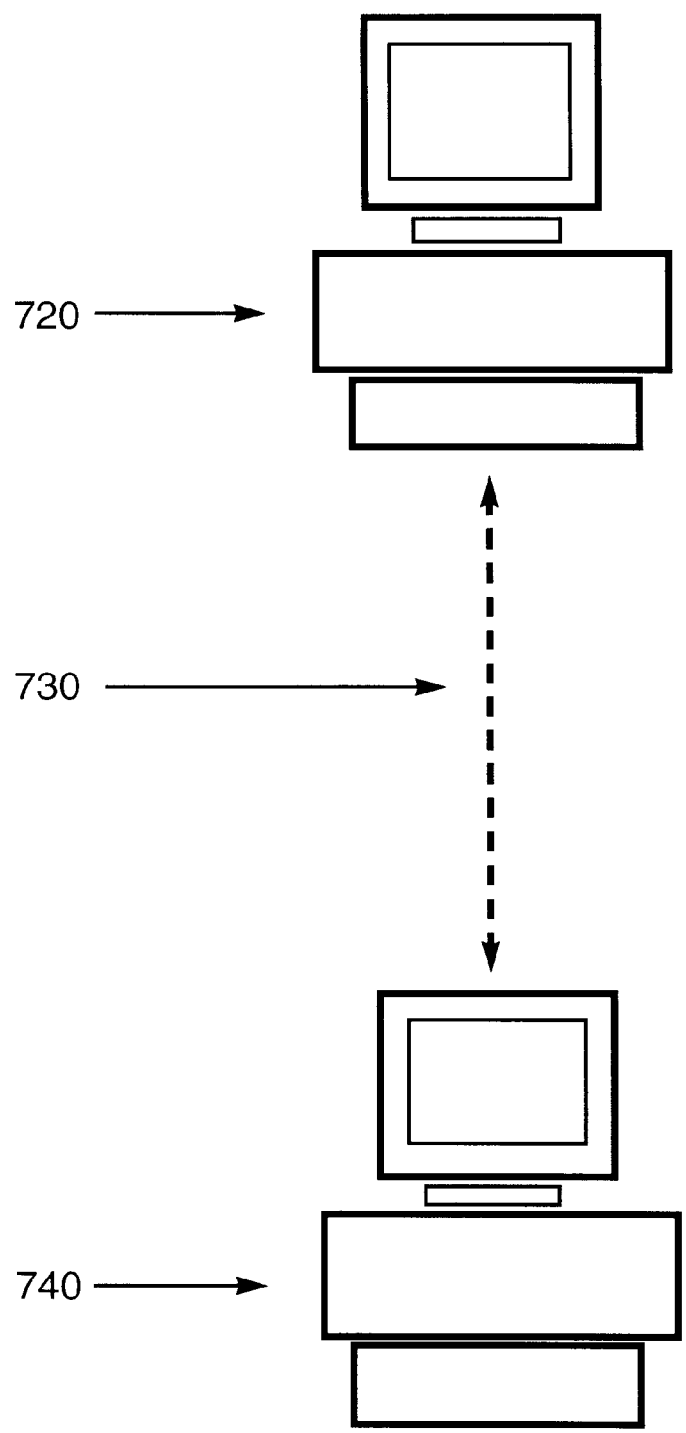
FIG. 9 is a block diagram illustrating an image modification system provided in accordance with one embodiment of the present invention.

Referring to FIG. 9, shown is a block diagram of a image modification system provided in accordance with one embodiment of the present invention. Specifically, the system demonstrates the workflow/methodology for transmitting compressed proxy images between an image origination station 720 and the image modification station 740 directly connected via a communication link 730. The image origination station 720 and image modification station 740 consist of, but are not limited to, a computer processing unit, display/monitor, input device (keyboard, tablet or mouse, etc.) and software application that accepts script technology. The communication link 730 may consist of, but is not limited to, a modem or network card and cable, but must open a link to other computers. Compressed proxy images are sent via communication link 730 from the image origination station 720 to the image modification station 740. The proxy image is decompressed, modified, scripted and the modification script is sent via communication Link 730 to the image origination station 720 for application to the original high resolution digital image.

Figure 10:
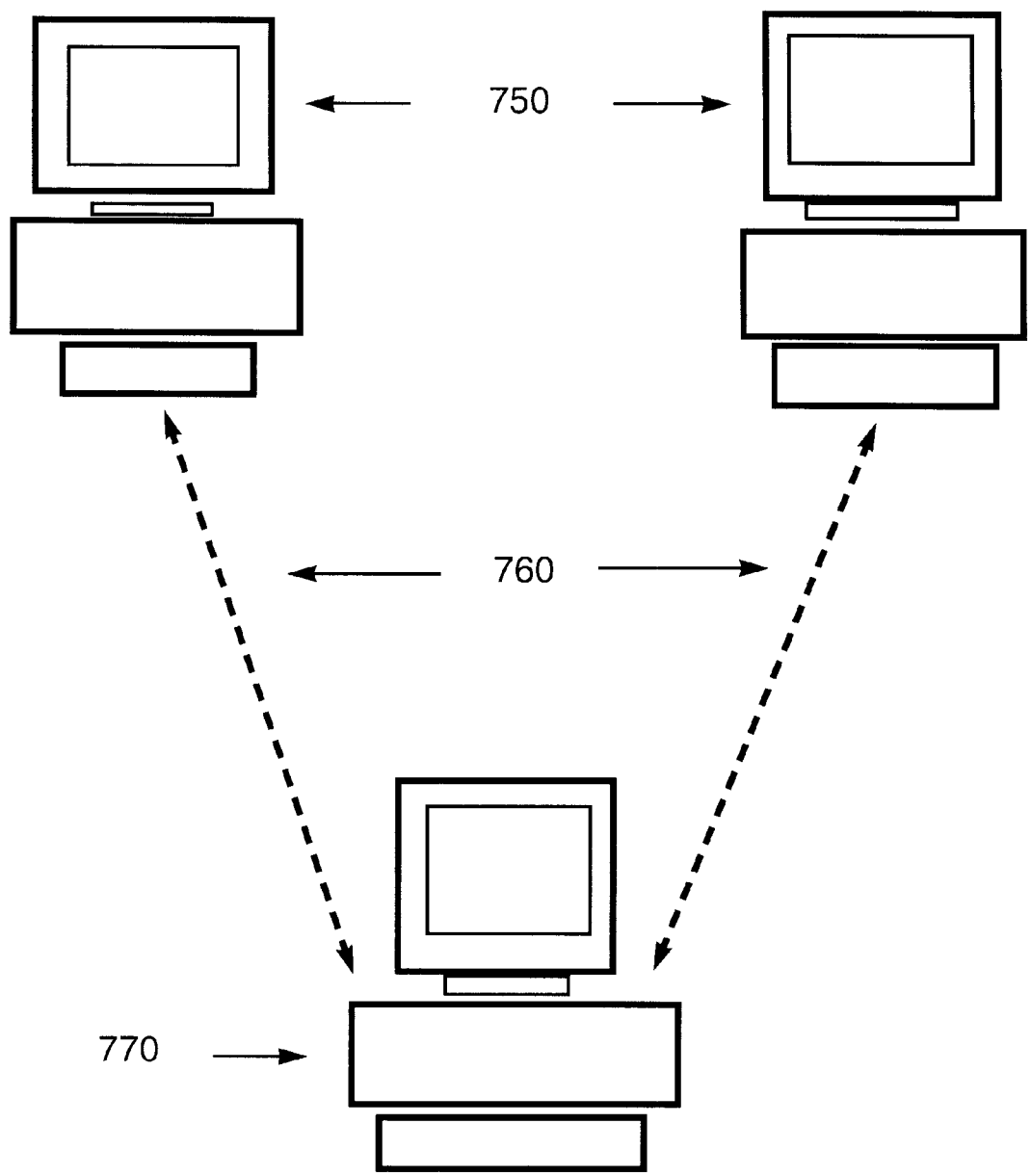
FIG. 10 is a block diagram illustrating an image modification system provided in accordance with an alternate embodiment of the present invention.

Referring to FIG. 10, shown is a block diagram of an image modification system provided in accordance with an embodiment of the present invention. Specifically, the system demonstrates the workflow/methodology for transmitting compressed proxy images between multiple image origination stations 750 directly connected to an image modification station 770 via a communication link 760. The image origination stations 750 and image modification station 770 consist of, but are not limited to, a computer processing unit, display/monitor, input device (keyboard, tablet, or mouse, etc.) and software application that accepts script technology. The communication link may consist of, but is not limited to, a modem or network card and cable, but must open a link to other computers. Compressed proxy images are sent via communication link from the image origination stations 750 to the image modification station 770. The proxy image is decompressed, modified, scripted and the modification script is sent via communication link 760 to the respective image origination station 750 for application to the original high resolution digital image file.

Figure 11:
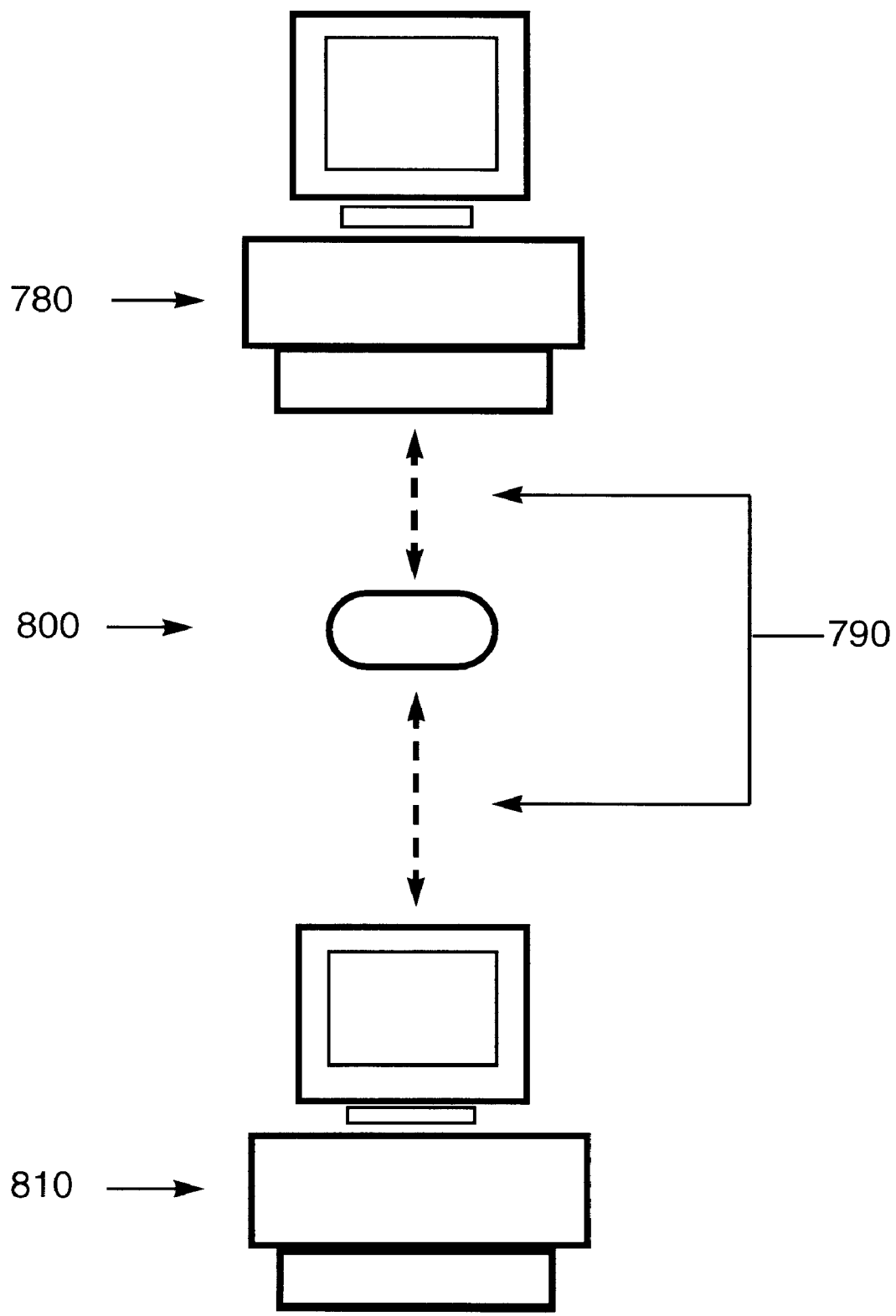
FIG. 11 is a block diagram illustrating an image modification system provided in accordance with yet another embodiment of the present invention.

Referring to FIG. 11, shown is a diagram of an image modification system provided in accordance with a still further embodiment of the present invention. The image modification system demonstrates the workflow/methodology for transmitting compressed proxy images between two sites using a common drop off and pick up site. An image origination station 780 and image modification station 810 are connected to an intermediate drop-off/pick-up site 800 via a communication link 790. The image origination station 780 and image modification station 810 consist of, but are not limited to, a computer processing unit, display/monitor, input device (keyboard, tablet or mouse, etc.) and software application that accepts script technology. The communication link 790 may consist of, but is not limited to, a modem or network card and cable, but must open a link to other computers. The intermediate drop-off/pick-up site 800 may be, but is not limited to, an on-site server, internet server, or remote ftp site. Compressed proxy images are sent via communication link 790 from the image origination site to the specified intermediate drop-off/pick-up site 800 whereby they are retrieved by the image modification station 810 via communication link 790. The proxy image is decompressed, modified, scripted and the script is sent via communication link 790 to the intermediate drop-off/pick-up site 800 whereby it may be retrieved and transferred to the image origination station 780 for application to the original high resolution digital image file.

Figure 12:
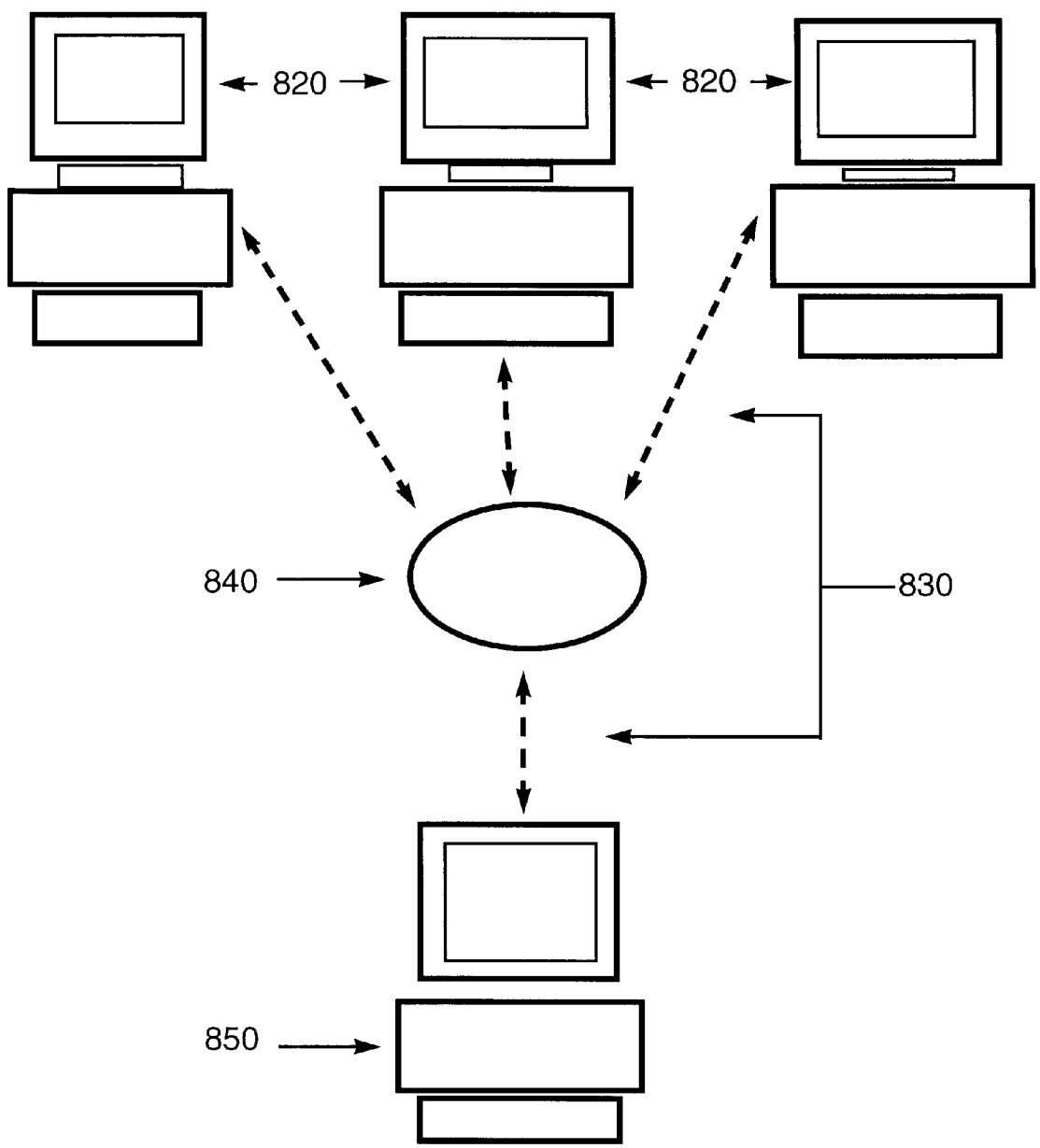
FIG. 12 is a block diagram illustrating an image modification system provided in accordance with a still further embodiment of the present invention.

Referring to FIG. 12, shown is a block diagram of an image modification system provided in accordance with yet another embodiment of the present invention. The image modification system demonstrates the workflow/methodology for transmitting compressed proxy images between multiple sites using a common drop off and pick up site. The image origination stations 820 and image modification station 850 are connected to an intermediate drop-off/pick-up site 840 via a communication link 830. The image origination stations 820 and image modification station 850 consist of, but are not limited to, a computer processing unit, display/monitor, input device (keyboard, tablet or mouse, etc.) and software application that accepts script technology. The communication link 830 may consist of, but is not limited to, a modem or network card and cable, but must open a link to other computers. The intermediate drop-off/pick-up site 840 may be, but is not limited to, an on-site server, internet server or remote ftp site. Compressed proxy images are sent via communication link 830 from the image origination stations 820 to the specified intermediate drop-off/pick-up site 840, where they may be thereafter transferred to the image modification station 850 via communication link 830. The proxy image is decompressed, modified, scripted and the script is sent via communication link 830 to the intermediate drop-off/pick-up site 840 where it may thereafter be transferred to the proper image origination station 820 for application to the original high resolution digital image file.

Figure 13:
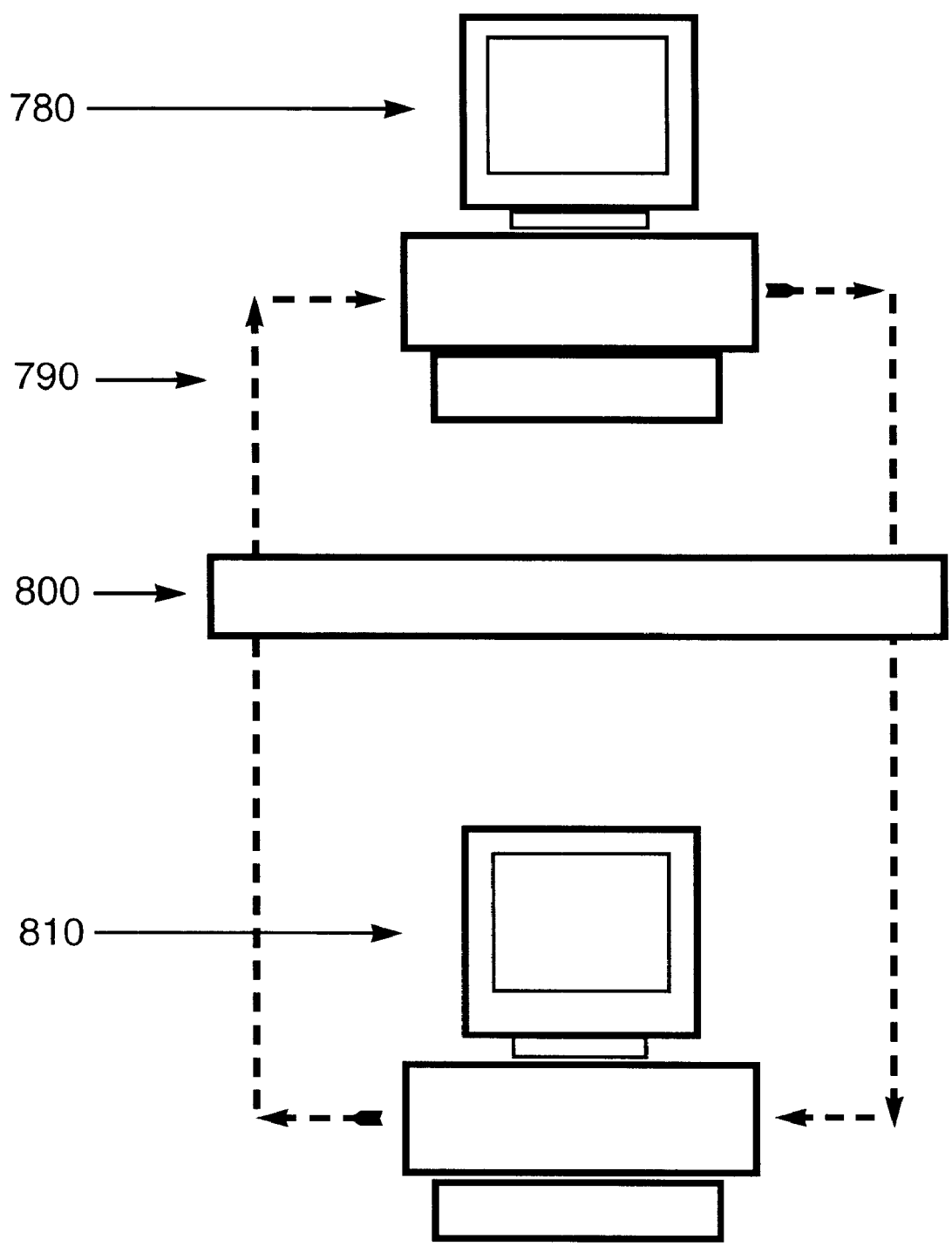
FIG. 13 is a block diagram illustrating an image modification system which is a variation of the embodiment shown in FIGS. 11 and 12.

Referring to FIG. 13, shown is a block diagram of an image modification system of a still further embodiment of the present invention. More specifically, the image modification system is an alternate embodiment of that shown in FIGS. 11 and 12.

As is evident from the foregoing, the present invention advantageously overcomes the drawbacks of the prior art. Specifically, the present invention provides the ability to modify high resolution digital image files without the need for transmitting it to an image correction facility. Instead, a much reduced file can be electronically transmitted to an image correction site in a quick and efficient fashion, thereby dramatically minimizing the transfer time. Moreover, this can be done without the need for sophisticated, expensive data transmission equipment, thereby leveling the playing field between competitors large and small alike.

What is claimed is:

1. A method of modifying a digital image file, comprising the steps of:

a first user at a first location initiating compression of a high resolution digital image to create a low resolution proxy file;

electronically transferring from a first location to a second location the low resolution proxy file;

a second user at a second location initiating decompressing the compressed low resolution proxy file to produce a restored low resolution proxy file;

performing one of a plurality of image correction modifications on the restored low resolution proxy file;

saving instructions representing the modifications as a script file; and electronically transferring from the second location to the first location the script file without sending the restored low resolution proxy file as part of the script file, such that the script file is applied to the high resolution digital image to produce a corrected high resolution digital image.

2. A method of modifying a digital image file, comprising the steps of:

a first user creating at a first location a low resolution proxy file of a high resolution digital image;

the first user compressing the low resolution proxy file to produce a compressed proxy file;

transmitting the compressed proxy file to a remote site;

a second user decompressing the compressed proxy file at the remote site to restore said low resolution proxy file;

modifying the restored low resolution proxy file at the remote site to generate a script of modifications;

transmitting the script of modifications to the first location without transmitting the restored low resolution proxy file as part of the script; and applying the script of modifications to said high resolution digital image at said first location.

3. A system for modifying a digital image file, comprising:

a first computing station at a first location, said first computing station including a processor programmed to produce a proxy file representing a high resolution digital image file;

a second computing station at a color shop, said second computing station including a processor programmed for decompressing said proxy file to produce a decompressed digital image file, for performing one of a plurality of digital image modifications on said decompressed digital image file, and for generating a script file representing the digital image modifications performed on said decompressed digital image file; and a communication system cooperatively coupled between said first and second computing systems for transferring said proxy file from said first computing system to said second computing system and for transferring said script file from said second computing system to said first computing system without transmitting the decompressed digital image file as part of the script file, such that said script file is applied to said high resolution digital image file to create a corrected high resolution digital image file.

4. A method of modifying a digital image file comprising the steps of:

a first user at a first location initiating compression of an original high resolution digital image to create a compressed copy;

electronically transferring the compressed copy from a first location to a second location;

a second user at a second location decompressing the compressed copy to produce a decompressed copy of the original high resolution digital image;

performing at the second location at least one image correction modification on at least a portion of the decompressed copy;

saving instructions representing the image correction modification as a script file; and electronically transferring the script file from the second location to the first location without transmitting the decompressed copy as part of the script file;

applying the script file to one of the original high resolution digital image or a copy of the original high resolution digital image at the first location to produce a corrected high resolution digital image.

5. The method of claim 4 wherein the step of electronically transferring comprises the steps of:

creating a low resolution proxy of at least a portion of the original high resolution digital image; and compressing the low resolution proxy to produce the compressed copy of the original high resolution digital image.

6. The method of claim 4 wherein the step of electronically transferring comprises the step of directly compressing a copy of at least a portion of the original high resolution digital image to produce the compressed copy of the original high resolution digital image.

7. The method of claim 4 comprising the step of applying the script file to one of the original high resolution digital image or a copy of the original high resolution digital image at the first location to produce a corrected high resolution image.

8. The method of claim 4 wherein the image correction modification comprises the step of altering one or more colors on at least a portion of the decompressed image.

9. The method of claim 4 wherein the image correction modification comprises the step of altering one or more pixels on the decompressed image.

10. The method of claim 4 comprising the step of performing a plurality of image correction modifications on at least a portion of the decompressed copy.

11. A method of modifying a digital image file comprising the steps of:

a first user at a first location initiating compression of a high resolution digital image to create a compressed copy;

electronically transferring at least a portion of the compressed copy from a first location to one or more second locations;

a second user at a second location decompressing the compressed copy to produce a decompressed copy of the original high resolution digital image;

performing at the second location at least one image correction modification on at least a portion of the decompressed copy;

saving instructions representing the image correction modification as a script file; and electronically transferring the script file from the second location to the first location without transferring the decompressed copy as part of the script file; and applying the script file at the first location to one of the original high resolution digital image or a copy of the original high resolution digital image to produce a corrected high resolution digital image.

12. The method of claim 4 wherein the second location comprises one or more locations.

13. A method of modifying a digital image file comprising the steps of:

a first user at a first location initiating compression of a high resolution digital image to create a compressed copy;

electronically transferring the compressed copy of the original high resolution digital image from a first location to a second location;

a second user at a second location decompressing the compressed copy to produce a decompressed copy of the original high resolution digital image;

performing at the second location at least one image correction modification on at least a portion of the decompressed copy;

saving instructions representing the image correction modification as a script file;

electronically transferring the script file from the second location to the first location without transferring the decompressed copy as part of the script file; and applying the script file to the original high resolution digital image at the first location to produce a corrected high resolution digital image.

14. The method of claim 13 wherein the image correction modification comprises the step of altering one or more colors on at least a portion of the decompressed image.

15. The method of claim 13 wherein the image correction modification comprises the step of altering one or more pixels on the decompressed image.

16. The method of claim 13 comprising the step of performing a plurality of image correction modifications on at least a portion of the decompressed copy.

17. A method of modifying a digital image file comprising the steps of:

a first user at a first location compressing a digital image to produce a compressed digital image;

transferring the compressed digital image to a remote location;

a second user at a second location decompressing the compressed digital image for image correction modification;

transferring to the first location a script file representing the image correction modification without transferring the decompressed digital image as part of the script file; and applying the script file to the digital image to produce a corrected digital image incorporating the image correction modifications.

18. The method of claim 17 wherein the image correction modification comprises the step of altering one or more colors on at least a portion of the decompressed image.

19. The method of claim 17 wherein the image correction modification comprises the step of altering one or more pixels on the decompressed image.

20. The method of claim 17 comprising the step of performing a plurality of image correction modifications on at least a portion of the decompressed copy.

21. A system for modifying a digital image file, comprising:

a first computing station at a first location, the first computing station including a processor programmed to produce a compressed copy of an original high resolution digital image file;

a second computing station at a second location, the second computing station including a processor programmed for decompressing the compressed copy to produce a decompressed digital image file, for performing one of a plurality of digital image modifications on the decompressed digital image file, and for generating a script file representing the digital image modifications performed on the decompressed digital image file; and a communication system cooperatively coupled between the first and second computing systems for transferring the compressed copy from the first computing system to the second computing system and for transferring the script file from the second computing system to the first computing system without transferring the decompressed digital image file as part of the script file, such that the script file is applied to the high resolution digital image file to create a corrected high resolution digital image file.

* * * * *

UNITED STATES PATENT AND TRADEMARK OFFICE
CERTIFICATE OF CORRECTION

PATENT NO.     : 6,304,277 B1
DATED          : October 16, 2001
INVENTOR(S)    : Hoekstra et al.

It is certified that error appears in the above-identified patent and that said Letters Patent is hereby corrected as shown below:

Column 14,
Lines 32-33, please delete "original high" and replace it with -- low --. Please delete "digital image" and replace it with -- proxy --.

Column 15,
Please delete claim 12.

Signed and Sealed this

Sixth Day of August, 2002

Attest:

JAMES E. ROGAN
Attesting Officer  Director of the United States Patent and Trademark Office